United States Patent [19]
Greene

[11] Patent Number: 5,675,234
[45] Date of Patent: Oct. 7, 1997

[54] MULTICELL BATTERY MONITORING SYSTEM

[75] Inventor: Leonard M. Greene, Scarsdale, N.Y.

[73] Assignee: Safe Flight Instrument Corporation, White Plains, N.Y.

[21] Appl. No.: 677,531

[22] Filed: Jul. 10, 1996

[51] Int. Cl.$^6$ .................. H01M 10/44; H01M 10/46; H01M 10/48

[52] U.S. Cl. .................. 320/15; 320/48; 324/430; 324/434

[58] Field of Search .................. 320/6, 7, 15, 16, 320/17, 30, 43, 44, 45, 48; 324/426, 430, 432, 433, 434

[56] References Cited

U.S. PATENT DOCUMENTS

| | | | |
|---|---|---|---|
| 5,160,851 | 11/1992 | McAndrews | 307/66 |
| 5,225,761 | 7/1993 | Albright | 320/15 |
| 5,448,152 | 9/1995 | Albright | 320/15 |
| 5,546,003 | 8/1996 | Noworolski et al. | 324/434 |

*Primary Examiner*—Edward Tso
*Attorney, Agent, or Firm*—David E. Dougherty

[57] ABSTRACT

A continuously monitored battery operated power supply for maritime applications includes four batteries which form a parallel connected pair of banks in which the cells in each bank are series connected to each other. A Wheatstone bridge circuit connects a midpoint between the plurality of cells in the first bank of battery cells and a midpoint between the plurality of cells in the second bank of batteries. The circuit also includes a volt meter for indicating a voltage change due to the degeneration of a cell when the voltage change exceeds a predetermined value.

9 Claims, 2 Drawing Sheets

MULTICELL BATTERY MONITORING SYSTEM

BACKGROUND OF THE INVENTION

Field Of The Invention

Rechargeable batteries, as for example, lead-acid storage batteries have been used for many years as sources of portable low-voltage electricity. In such batteries, chemical energy is converted directly into electrical energy and a number of cells are connected in series. In this manner, each cell adds its voltage to the total voltage of the voltage cells in the string below it. The output voltage of such cell depends upon the type of cell and material used within the cell. For example, galvanic cells such as the lead-acid storage batteries produce an open circuit voltage of approximately 2.2 volts per cell.

The concept of connecting voltage cells in series to produce a useful working voltage is easily accomplished as long as the performance of each voltage cell closely matches the performance of the other cells in the stack. However, if for some reason, a voltage cell does not perform in the same manner as the other cells in the group and presents a higher impedance to the current flowing through it, localized heating may occur within the cell which can cause permanent damage to the cell. In some cases, the cell polarization reverses to produce a potentially dangerous situation. This performance imbalance, localized heating, and reversal of cell polarization readily occur in galvanic cells which are deeply discharged.

The aforementioned problems are exacerbated in modern sailing craft which incorporate two banks of batteries for operating automatic furling, lighting and other electrical apparatus. In such craft, it is common practice to use one bank of batteries on odd days of the month and the other bank of batteries on even days. On those days when one bank of batteries is being used, i.e., discharging, the other bank of batteries may be charged when the boat's motor is in use. This results in deep cycling of the batteries and greatly shortens the effective life of the battery. Placing the two batteries banks in a parallel circuit offers a number of advantages. By doing so, one obtains twice the power and capacity which reduces the cycling, heat, plate warpage, and the like. In addition, both battery banks will be charged whenever the engine is used so that each bank of batteries will be maintained at near capacity or a fully charged state. It has now been found that placing the two battery banks in parallel has greatly increased the useful life of the batteries. For example, in one boat, two banks of five year batteries lasted only one year when used alternately. By contrast, two battery banks of two year batteries in a parallel circuit, have lasted under similar conditions for several years with no evidence of deterioration.

Nevertheless, there is one serious problem associated with placing the battery banks in a parallel circuit. The problem is that if a single cell fails, it can short out both banks of batteries so that there is a total loss of power. For this reason, it is highly desirable to include an early warning device to indicate any impending battery failure due to the degeneration of one cell. Then, at the first indication of cell degeneration, the battery can be switched out of the circuit and the other battery bank relied upon until such time that the weakened battery can be replaced.

BRIEF SUMMARY OF THE INVENTION

In essence, the present invention contemplates a battery monitor for detecting cell degeneration in a circuit which includes a pair of rechargeable batteries. The circuit includes a first bank of battery cells which are connected in series and a second bank of battery cells which are also connected in series. First circuit means are provided and connect the first bank of battery cells and the second bank of battery cells in parallel with one another. The second circuit means connects a midpoint between the plurality of cells in the first bank of battery cells and a midpoint between the plurality of cells in the second bank of batteries. This second circuit means also includes means for indicating a voltage change due to the degeneration of a cell when the voltage change exceeds a predetermined value. In the preferred embodiment of the invention, the second circuit includes a Wheatstone bridge.

As indicated above, the invention is especially suitable for maritime applications, in which it is desirable to build redundancy into the power supplies by connecting banks of batteries in parallel and providing switches for disconnecting banks requiring servicing. The principle objective of the invention is to provide continuous real time monitoring of the condition of the battery cells using a single measuring device connected at an appropriate location between the cells.

It is a further objective of the invention to provide a power supply circuit for such applications, and to provide real time monitoring not only of the changes in overall voltage output, but also an indication of which bank of cells is responsible for the changes in order to permit one of the individual banks to be serviced while the other bank continues to operate.

It is yet another objective of the invention to accomplish the above objectives with a minimum of circuit connections.

These objectives are accomplished, according to a preferred embodiment of the invention, by connecting the battery cells in two parallel connected banks of mutually series connected cells such that the total internal resistance of cells in good condition is equal on either side of a midpoint in each of the banks, and by connecting a measuring device across the midpoints of the cells to form a bridge circuit, with the measuring device being thereby responsive to changes in internal resistance of cells on either side of the midpoint, and with the polarity of resulting voltage changes between the midpoints determining the bank containing the cells whose internal resistance has changed.

The foregoing, as well as other objects and advantages of the invention, will become apparent from the following detailed description when considered in conjunction with the accompanying drawings, wherein like reference characters designate like parts throughout the several views, and wherein:

DETAILED DESCRIPTION OF THE PREFERRED EMBODIMENTS

Figure 1:
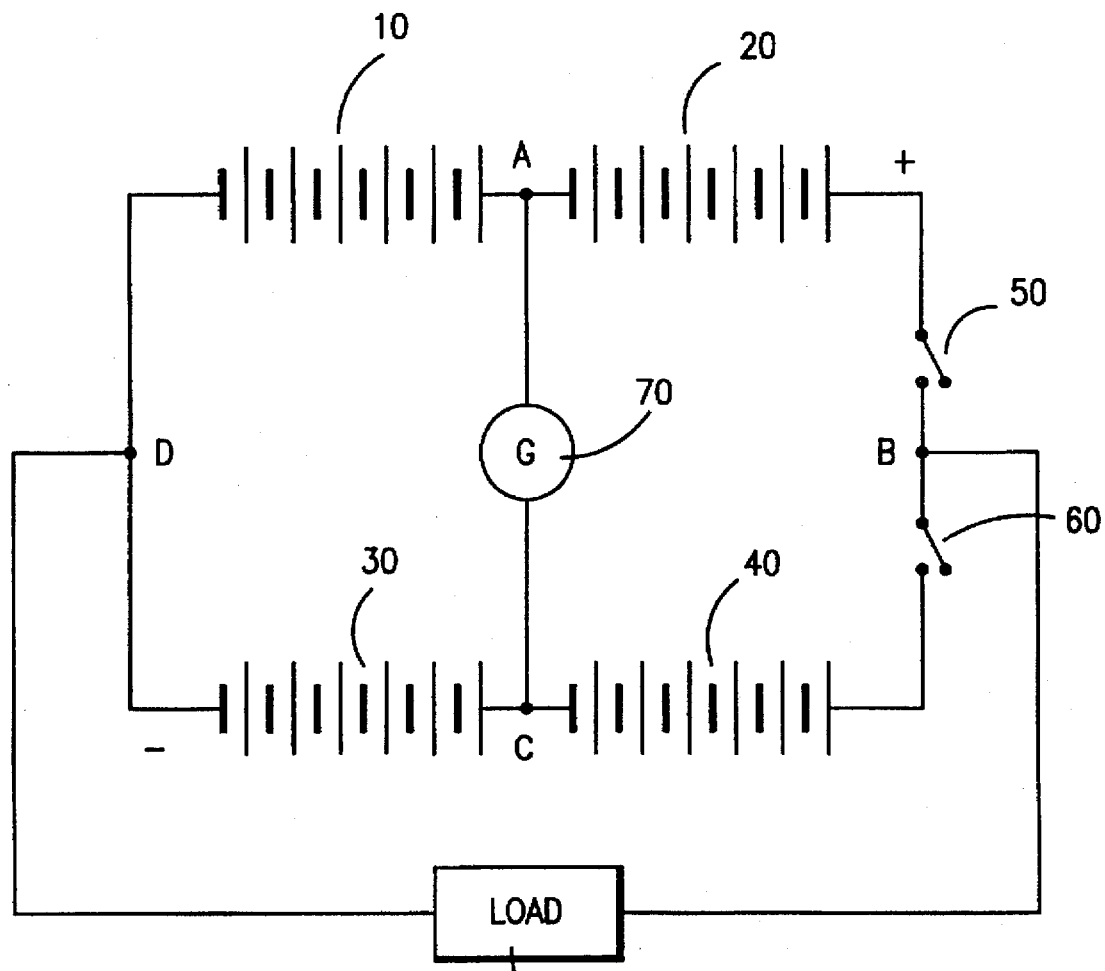
FIG. 1 is a circuit diagram illustrating a first embodiment of the invnetion.

As illustrated in FIG. 1, power to the load 2 is normally supplied by two banks of batteries, each of which is made up of a plurality of individual batteries cells mutually connected in series. Typically, each bank includes a pair of batteries 10,20 and 30,40, and each battery is made up of six two volt cells, with the two banks of batteries being connected to the load through respective switches 50 and 60. When switches 50 and 60 are both closed, the two pairs of batteries are connected in parallel, and when either of the switches is open, the associated bank is disconnected from the load, leaving the other bank connected in series with the load. Normally, both switches are closed to provide increased battery life, with the appropriate switch being opened to disconnect the corresponding pair of batteries in order to permit replacement or servicing of an individual battery.

Figure 2:
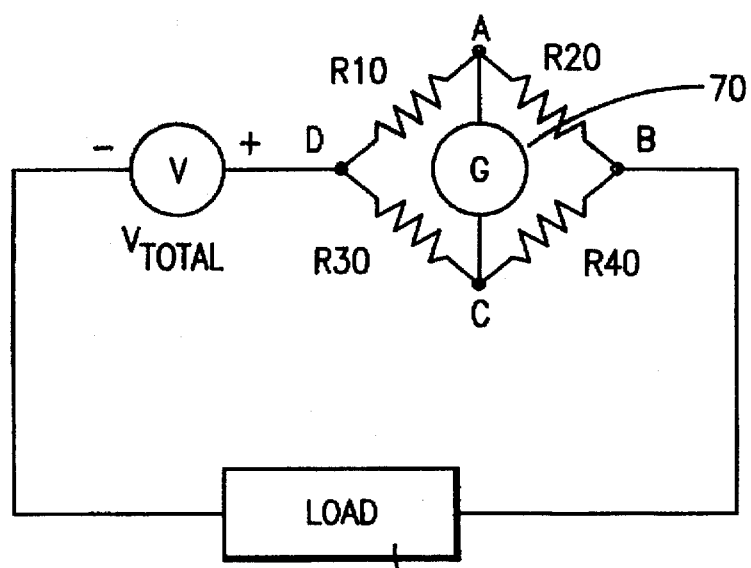
FIG. 2 is a circuit diagram illustrating a second embodiment of the invention.
Figure 3:
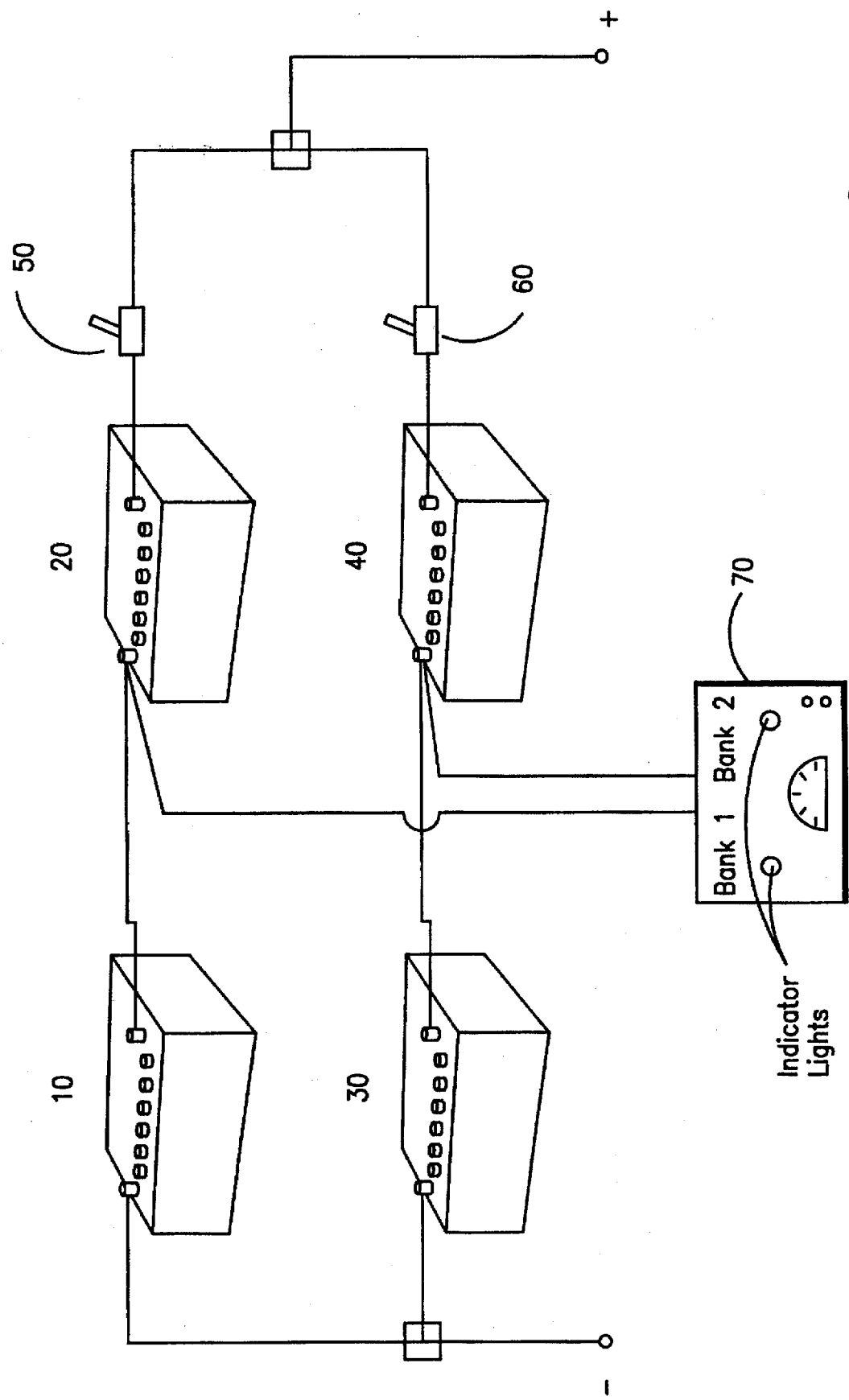
FIG. 3 is a schematic illustration of a preferred embodiment of the invention.

It will be appreciated by those skilled in the art that the batteries 10–40 may take a variety of forms, and that the invention is not limited to pairs of 12 Volt batteries made up of individual two volt battery cells. Each bank can be made up of an arbitrary number of batteries, each consisting of an arbitrary numbers of internal battery cells connected in parallel or series. However, irrespective of the battery structure, each of the batteries can be represented as an ideal voltage source and an internal resistance, so that the overall circuit can be represented by the equivalent circuit in which the total internal resistances R10–R40 of the respective batteries are connected as illustrated in FIG. 2 to a voltage source which represents the combined voltage output of the battery banks. In both FIGS. 1 and 2, the series connections between the batteries in each bank are represented by letters A and C, and the common parallel connections by letters B and D.

The use of parallel connected banks of batteries is of course conventional. The unique aspect of the circuit shown in FIG. 1, and its equivalent shown in FIG. 2, is that a measuring device 70 is connected between points A and C, as will be described below, for purposes of monitoring the condition of the batteries in the bank. While points A and C could in theory be located at points other than the midpoints of the two banks of batteries, at the physical connections between respective batteries in each pair, for purposes of convenience it is preferred that the total number of cells on each side of connection points A and C be equal, so that resistances R10–R40 in the equivalent circuit of FIG. 2 are equal when the batteries are in good condition. If not equal, then at least the ratio R10/R20 should equal the ratio R30/R40.

The objective of the circuit configuration illustrated in FIG. 1 is to provide a convenient way of monitoring the conditions of the batteries in the respective banks and to provide a warning when one or more battery cells in either bank needs to be serviced or replaced. The reason the circuit is able to accomplish this objective is that when a battery cell fails, the internal resistance of the cell increases, at which time a potential difference occurs between points A and C, which can be measured by the measuring device 70 connected between the points. By connecting the measuring device across the midpoints of the banks of batteries, a baseline of zero can be used to indicated normal operation of the batteries, so that the presence of any non-zero potential difference indicates a failing cell.

If the ratios of the resistances on either side of the ammeter have been chosen to be equal (i.e., R10*R40= R20*R30) when the batteries are operating properly, so that no current will appear at device 70, when the internal resistance of any cell rises as a result of aging or defect, then the ratios of the resistances will change and a current will be measured, the direction of the current depending on which bank includes the defective battery. The magnitude of changes that can be measured in this way depends solely on the sensitivity of the measuring device 70, and thus it is possible to provide a warning for very small changes in battery condition, if desired. As a result, it can be seen that the measuring device 70 can be any current responsive device, including a micro-ammeter, lighting circuit, sound generator, computer, or combination of the above. In addition, a threshold activating current can be chosen so that the measuring device does not respond to minimal changes in battery function such as might be caused by temperature differences rather than battery cell deterioration, a computer can be used to monitor current fluctuation patterns in order to separate aging patterns from ordinary fluctuations.

One of the advantages of the illustrated arrangement is the simplicity of the connection required to monitor battery condition, namely a single connection or bridge between points A and C. Because of this simplicity it might, in hindsight, appear that this is the most obvious way to monitor the condition of a parallel connected bank of batteries. However, this is not the case. In general, the usual way to monitor battery condition is to periodically measure, using a voltage measuring device, the voltage output of individual batteries or the total voltage output of the banks of batteries. What the inventor has recognized is that, in a parallel configuration involving multiple batteries in each bank, the internal resistances of the batteries form what is referred to in the art as a Wheatstone bridge. While Wheatstone bridges are also known, the usual way of applying the Wheatstone bridge concept is to connect a component whose resistance is to be measured as one of the resistors in the bridge, with the other three resistors being in the form of components of known resistance. To conceive of the parallel connected batteries as forming a bridge circuit actually allows simplification of the measuring circuit, and at the same time provides continuous monitoring and the ability to generate a warning without the relatively complex circuitry that would be required using conventional battery monitoring equipment.

Furthermore, it will be appreciated that the illustrated configuration not only provides continuous real time monitoring of cell condition, but also that the it provide an indication of which of the banks contains a defective cell. This can easily be accomplished by making measuring device 70 responsive to the polarity of the potential difference between points A and C. This is especially important where one of the banks must remain connected while the other is being serviced, as is the case for a ship at sea. Thus, when the measuring device indicates that one of the banks needs to be service, the corresponding switch 50 or 60 can be opened, either manually or automatically under control of the measuring device, to disconnect the defective bank from the main power supply circuit. Because of the parallel configuration, the remaining bank will still provide sufficient voltage to maintain operation of the load.

As is apparent from the above, the invention requires a minimum of four discrete battery cells. However, the upper limit on the number of cells is unlimited. In addition, where the number of batteries is greater than four, additional monitors could be added by forming additional bridge connections, and the sophistication of the monitoring equipment represented by measuring device 70 can be increased as desired. Consequently, it will be appreciated that the invention is not intended to be limited to the specific configuration shown, but rather should include all variations and modifications fairly included within the scope of the appended claims.

While the invention has been described in connection with its preferred embodiment, it should be recognized and understood that changes and modifications may be made therein without departing from the scope of the appended claims.

What is claimed is:

1. A continuously monitored battery-operated power supply comprising at least four battery cells forming a parallel connected pair of banks, in which the cells in each bank are series-connected to each other, and wherein each bank contains at least two batteries, and each battery contains a plurality of said cells, with the midpoints being located at a respective connection between two batteries in each bank, and said midpoints being defined as to points where the internal resistance of cells on either side of the midpoints in each bank is normally equal;

a measuring device connected between the banks, said measuring device being responsive to changes in internal resistance of any of the cells in either bank wherein said measuring device being responsive to changes to internal resistance of any of the cells in either bank wherein said measuring device is connected between said midpoints of the banks, so that, when the internal resistance of one of the cells changes, a potential difference arises across the measuring device, the polarity of which depends on which bank contains the cell whose internal resistance has changed; and said power supply further comprising a switch for each bank, whereby the bank containing the cell whose internal resistance has changed can be disconnected from a load.

2. A power supply as claimed in claim 1, wherein said measuring device provides an audible or visual warning whenever said potential difference changes by a predetermined amount.

3. A battery monitor for detection of cell degeneration in a circuit which includes a pair of rechargeable batteries comprising:

a. a first bank of battery cells connected in series;

b. a second bank of battery cells connected in series;

c. first circuit means connecting said first bank of battery cells and said second bank of battery cells in parallel;

d. second circuit means connecting a midpoint between the plurality of cells in said first bank of battery cells and a midpoint between the plurality of cells in said second bank of battery cells; and e. said second circuit means including means for indicating the voltage change due to the degeneration of a cell when the voltage change exceeds a predetermined value.

4. A battery monitor for detection of cell degeneration in a circuit which includes a pair of rechargeable batteries according to claim 3 in which said second circuit means includes a Wheatstone bridge.

5. A battery monitor for detection of cell degeneration in a circuit which includes a pair of rechargeable batteries according to claim 4 in which said Wheatstone bridge includes a plurality of resistance elements and a volt meter across said bridge for indicating that a cell in one of the batteries has a low voltage output.

6. A battery monitor for detection of cell degeneration in a circuit which includes a pair of rechargeable batteries according to claim 5 in which said resistance elements are diodes.

7. A battery monitor for detection of cell degeneration in a circuit which includes a pair of rechargeable batteries according to claim 6 includes means for removing one of said banks of batteries from said first circuit means in response to a signal from said means for indicating a voltage change due to the degeneration of a cell when the voltage change exceeds a predetermined value.

8. A method for monitoring cell degeneration in a circuit which includes a pair of rechargeable batteries which includes the steps of:

a. producing a first bank of an even number of battery cells connected in series;

b. providing a second bank of an even number of battery cells in connected series;

c. dividing each of said banks of battery cells in half to thereby provide a midpoint in each of said banks with an equal number of cells on each side thereof;

d. connecting said midpoints through a Wheatstone bridge which includes a voltage indicator; and e. indicating a voltage change in response to the degeneration of a cell.

9. A method for monitoring cell degeneration in a circuit according to claim 8 which includes the step of removing one of said banks of batteries from said circuit in response to a voltage change across the Wheatstone bridge.

* * * * *